United States Patent
Lewis et al.

(10) Patent No.: US 10,656,804 B1
(45) Date of Patent: May 19, 2020

(54) CONTEXTUAL RECOMMENDATIONS BASED ON INTERACTION WITHIN COLLECTIONS OF CONTENT

(71) Applicant: Google LLC, Mountain View, CA (US)

(72) Inventors: Justin Lewis, Marina del Rey, CA (US); Joseph Daverin, San Gabriel, CA (US)

(73) Assignee: GOOGLE LLC, Mountain View, CA (US)

( * ) Notice: Subject to any disclaimer, the term of this patent is extended or adjusted under 35 U.S.C. 154(b) by 104 days.

(21) Appl. No.: 15/952,831

(22) Filed: Apr. 13, 2018

Related U.S. Application Data (63) Continuation of application No. 14/670,220, filed on Mar. 26, 2015, now Pat. No. 9,952,748.

(60) Provisional application No. 61/971,923, filed on Mar. 28, 2014.

(51) Int. Cl.
*G06F 3/048* (2013.01)
*G06F 3/0484* (2013.01)
*H04L 29/08* (2006.01)

(52) U.S. Cl.
CPC .......... *G06F 3/0484* (2013.01); *H04L 67/306* (2013.01)

(58) Field of Classification Search
CPC ................................................ G06F 3/0484
USPC ......................................................... 715/745
See application file for complete search history.

(56) References Cited

U.S. PATENT DOCUMENTS

| | | | |
|---|---|---|---|
| 8,046,366 B1 * | 10/2011 | Perrin | H04L 41/5009 |
| | | | 707/741 |
| 8,260,657 B1 | 9/2012 | Conway | |
| 8,495,698 B2 | 7/2013 | Walker et al. | |
| 9,659,068 B1 * | 5/2017 | Mattsson | G06F 16/24578 |
| 10,015,539 B2 * | 7/2018 | Templeman | H04N 21/4312 |
| 10,284,914 B2 * | 5/2019 | Hamano | G06F 21/6218 |
| 10,313,755 B2 * | 6/2019 | Kimble | H04N 7/17318 |
| 10,389,776 B2 * | 8/2019 | Brown | H04L 67/146 |
| 10,405,044 B1 * | 9/2019 | Seely | H04N 21/4667 |
| 10,411,908 B2 * | 9/2019 | Root | H04W 4/20 |
| 10,419,830 B2 * | 9/2019 | Packard | H04N 21/23418 |

(Continued)

OTHER PUBLICATIONS

Creators, The Official YouTube Partners and Creators Blog; "Changes to Related and Recommended Videos" Mar. 9, 2012, [retrieved from http://youtubecreator.blogspot.com/2012/03/changes-to-related-and-recommended.html on Mar. 26, 2015].

(Continued)

*Primary Examiner* — David Phantana-angkool
(74) *Attorney, Agent, or Firm* — Lowenstein Sandler LLP (57) ABSTRACT

The subject matter of this specification can be implemented in, among other things, a method that includes storing a plurality of references to one or more first videos and at least one second video at a content hosting system for a first playlist. The method further includes receiving one or more first interactions with the first videos from one or more first user accounts. The method further includes selecting, by at least one processing device, the second video based on the second video belonging to the same first playlist as the first videos and on the first interactions with the first videos from the first user accounts. The method further includes providing, for presentation in a user interface, a recommendation to view the second video to a second user account other than the first user accounts.

20 Claims, 5 Drawing Sheets

(56) References Cited

U.S. PATENT DOCUMENTS

| | | | |
|---|---|---|---|
| 10,467,998 B2* | 11/2019 | Silverstein | G10H 1/00 |
| 2002/0056095 A1 | 5/2002 | Uehara et al. | |
| 2008/0134043 A1 | 6/2008 | Georgis et al. | |
| 2014/0298194 A1 | 10/2014 | Prasad et al. | |
| 2016/0321364 A1* | 11/2016 | Todasco | G06F 16/9535 |
| 2017/0238056 A1* | 8/2017 | Greene | H04N 21/4668 |
| | | | 725/131 |
| 2019/0026817 A1* | 1/2019 | Helferty | G06Q 30/0633 |

OTHER PUBLICATIONS

Darwell, Brittany; "Facebook expands Sponsored Stories in news Feed with image, more social context", Mar. 26, 2012, [retrieved from http://www.adweek.com/socialtimes/facebook-expands-sponsored-stories-in-news-feed-with-image-more-social-context/276936?red=if on Mar. 26, 2015.

\* cited by examiner

CONTEXTUAL RECOMMENDATIONS BASED ON INTERACTION WITHIN COLLECTIONS OF CONTENT

CROSS-REFERENCE TO RELATED APPLICATIONS

This application is a continuation of U.S. patent application Ser. No. 14/670,220, filed on Mar. 26, 2015 and entitled "Contextual Recommendations Based on Interaction within Collections of Content," which claims the benefit of U.S. Provisional Patent Application Ser. No. 61/971,923, filed on Mar. 28, 2014 and entitled "Contextual Recommendations Based on Interaction within Collections of Content," the entire contents of which are incorporated herein by reference.

TECHNICAL FIELD

This instant specification relates to contextual recommendations based on interaction within collections of content.

BACKGROUND

A video hosting system allows a user with an account at the video hosting system to upload video content from a client computer device to the video hosting system. The video hosting system then stores the uploaded video content. The user may have a channel at the video hosting system that presents content uploaded by the user. The user may choose to share the uploaded video content with other users on the channel of the user. The user may also create playlists of content. The playlists may include content uploaded by the user on the user's channel or content from the channels of other user accounts. The user may also interact with video content from other users. For example, the user may view, comment on, or rate the video content of others (e.g., with a numerical rating, a five-star rating, or by "liking" or "disliking" the content).

SUMMARY

In one aspect, a method includes storing one or more first content items and a second content item that belong to a collection at a content hosting system. The method further includes receiving one or more interactions with the first content items from one or more first user accounts. The method further includes selecting, by a processing device, the second content item and providing a recommendation to a second user account to view the second content item based on the second content item belonging to the same collection as the first content items and on the interactions with the first content items.

Implementations can include any, all, or none of the following features. The method can include selecting a particular user account from the first user accounts. The recommendation can include an indication of the particular user account. The first user accounts can have a plurality of user types. Each user type in the plurality of user types can have a priority. Selecting the particular user account can be based on the priority of the user type of the particular user account. Each of the first user accounts can have an affinity with the second user account based on interactions between the first user accounts and the second user account. Selecting the particular user account can be based on the affinity between the particular user account and the second user account. The first content items in the collection can include content items from ones of the first user accounts other than the particular user account. The method can include selecting a particular interaction from the interactions. The recommendation can include an indication of the particular interaction. The interactions can have a plurality of interaction types. Each interaction type in the plurality of interaction types can have a priority. Selecting the particular interaction can be based on the priority of the interaction type of the particular interaction.

In one aspect, a non-transitory computer-readable medium having instructions stored thereon that, when executed by a processing device, cause the processing device to perform operations includes storing one or more first content items and a second content item that belong to a collection at a content hosting system. The operations further include receiving one or more interactions with the first content items from one or more first user accounts. The operations further include selecting, by the processing device, the second content item and providing a recommendation to a second user account to view the second content item based on the second content item belonging to the same collection as the first content items and on the interactions with the first content items.

Implementations can include any, all, or none of the following features. The non-transitory computer-readable medium can include selecting a particular user account from the first user accounts. The recommendation can include an indication of the particular user account. The first user accounts can have a plurality of user types. Each user type in the plurality of user types can have a priority. Selecting the particular user account can be based on the priority of the user type of the particular user account. Each of the first user accounts can have an affinity with the second user account based on interactions between the first user accounts and the second user account. Selecting the particular user account can be based on the affinity between the particular user account and the second user account. The first content items in the collection can include content items from ones of the first user accounts other than the particular user account. The operations can include selecting a particular interaction from the interactions. The recommendation can include an indication of the particular interaction. The interactions can have a plurality of interaction types. Each interaction type in the plurality of interaction types can have a priority. Selecting the particular interaction can be based on the priority of the interaction type of the particular interaction.

In one aspect, a system includes a memory to store one or more first content items and a second content item that belong to a collection at a content hosting system. The system further includes an interface to receive one or more interactions with the first content items from one or more first user accounts. The system further includes a processing device to select the second content item and provide a recommendation to a second user account to view the second content item based on the second content item belonging to the same collection as the first content items and on the interactions with the first content items.

Implementations can include any, all, or none of the following features. The processing device can be further to select a particular user account from the first user accounts. The recommendation can include an indication of the particular user account. The first user accounts can have a plurality of user types. Each user type in the plurality of user types can have a priority. The processing device can be further to select the particular user account based on the priority of the user type of the particular user account. Each of the first user accounts can have an affinity with the second user account based on interactions between the first user accounts and the second user account. The processing device can be further to select the particular user account based on the affinity between the particular user account and the second user account. The processing device can be further to select a particular interaction from the interactions. The recommendation can include an indication of the particular interaction. The interactions can have a plurality of interaction types. Each interaction type in the plurality of interaction types can have a priority. The processing device can be further to select the particular interaction based on the priority of the interaction type of the particular interaction.

In one aspect, a method includes sending, by a processing device of a second user account, a request to present a user interface to a content hosting system. The content hosting system stores one or more first content items and a second content item that belong to a collection at the content hosting system. The content hosting system receives one or more interactions with the first content items from one or more first user accounts. The content hosting system selects the second content item. The method further includes in response to sending the request, receiving, by the processing device of the second user account, a recommendation from the content hosting system to view the second content item based on the second content item belonging to the same collection as the first content items and on the interactions with the first content items.

The details of one or more implementations are set forth in the accompanying drawings and the description below. Other features and advantages will be apparent from the description and drawings, and from the claims.

DETAILED DESCRIPTION

This document describes systems and techniques for contextual recommendations based on interaction within collections of content. The system selects content to be recommended based on membership of the content in a collection with other content that has received interactions from users. The system recommends the selected content to another user based on the membership of the content in the collection and the interactions from the other users. The system may also select a particular one of the other user accounts and/or the interactions for inclusion in the recommendation. In some implementations, the recommended content has received little or no direct interaction from the users of the system prior to being recommended.

The systems and techniques described here may provide one or more of the following advantages. First, a system can provide for recommending content before the content has had direct interaction with a significant number of users or even any users. Direct action may include, for example, viewing the content, sharing the content, rating the content, adding the content to another collection, or commenting on the content. Second, a system can provide for recommending content that is socially relevant to the user who views the recommendation.

Figure 1:
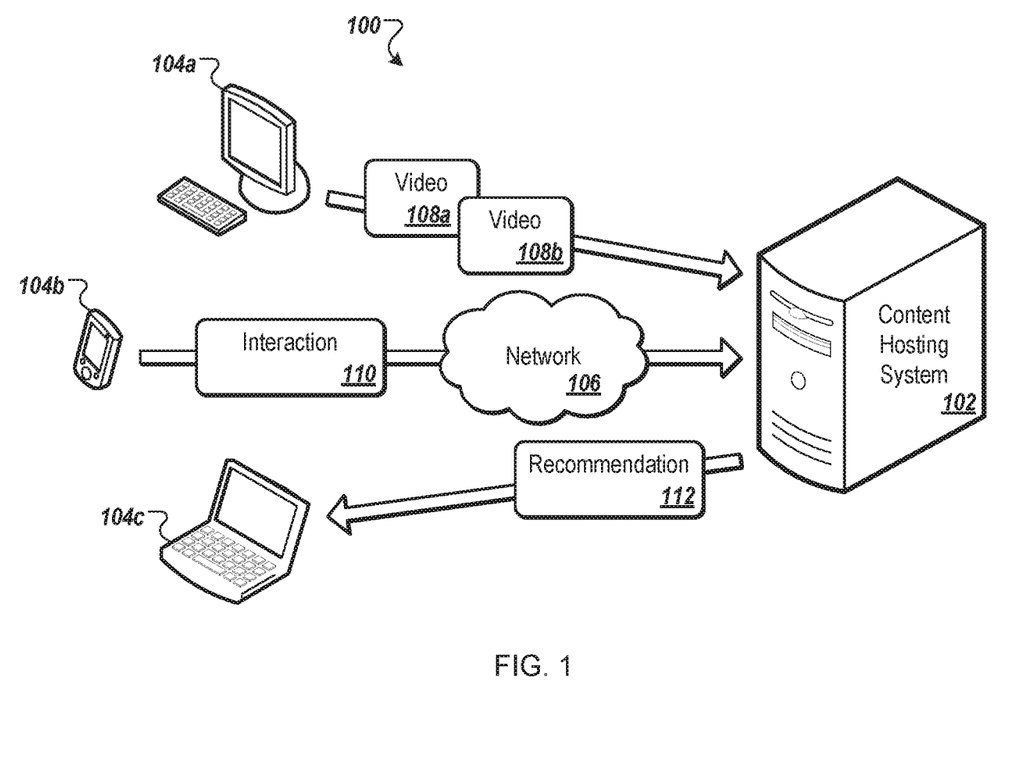
FIG. 1 is a schematic diagram that shows an example of a system for contextual recommendations based on interaction within collections of content.

FIG. 1 is a schematic diagram that shows an example of a system 100 for contextual recommendations based on interaction within collections of content. The system 100 includes a content hosting system 102 in communication with one or more computer devices 104a-c over one or more networks 106, such as a local network, a wide network, and/or one or more of the computer devices that make up the Internet. The computer devices 104a-c may include, for example, desktop computers, laptop computers, and/or mobile devices, such as smartphones. The content hosting system 102 includes one or more computer devices that may include processing devices, storage devices, and network interfaces.

A first user at the first computer device 104a may upload content, such as a first video 108a and a second video 108b, from the first computer device 104a to an account of the first user at the content hosting system 102. In some implementations, the content hosting system 102 may also host other types of content, such as text, images, and/or audio. The first user may then make the first video 108a and the second video 108b available to other users and/or computer devices. For example, the first user at the first computer device 104a may send a command to the content hosting system 102 to publish the first video 108a and the second video 108b, e.g., to particular users, devices, and/or to the general public.

The first user may also send a request to the content hosting system 102 to add the first video 108a and the second video 108b to a particular collection of content. In some implementations, a collection may include or reference content from another user account, such as a playlist of content items. A playlist for a particular user account includes a list of content items curated by the user account that may be uploaded by the user account and/or other user accounts. For example, a playlist on the channel of the first user may include pointers to content uploaded by a second user from the second computer device 104b. Alternatively, the content hosting system 102 may automatically add the first video 108a and the second video 108b to a particular collection, such as a collection of videos for a channel associated with the first user at the content hosting system 102. A channel for a particular user account includes a list of content items uploaded or otherwise provided by the user account. In some implementations, a user account may have only one channel. Alternatively, a user account may have multiple channels. A channel may correspond to a profile of the user account at the content hosting system 102. A channel may be automatically created, such as by including all content items uploaded, all content items of a particular type (e.g., videos versus still images or audio), or content items having a particular tag (e.g., a list of content items that the user account uploads with a "music" tag).

Other users, such as the second user, may then make one or more interactions 110 with the first video 108a. For example, the content hosting system 102 may receive commands from the second user at the second computer device 104b to view the first video 108a, rate the first video 108a, add the first video 108a to a playlist, comment on the first video 108a, and/or share the first video 108a. Viewing may include downloading or streaming the first video 108a from the content hosting system 102 and presenting the first video 108a at the second computer device 104b. Rating may include a quantitative and/or qualitative indication of the significance of the first video 108a. For example, the content hosting system 102 may receive ratings on a numerical scale of one to ten, one star to five stars, or a like and/or dislike.

The content hosting system 102 then selects the second video 108b based on the interactions with the first video 108a and on the membership of the first video 108a and the second video 108b in the same collection. The membership and the interactions may indicate that the second video 108b is relevant to another user even though there may have been little or no interaction with the second video 108b. In some implementations, the content hosting system 102 selects the collection for the second video 108b based on the number of content items in the collection being larger than the number of content items in other collections. In addition, the content hosting system 102 may select the collection of the second video 108b based on the number of interactions within the collection being larger than the number of interactions with content items in other collections. The content hosting system 102 may then select the second video 108b within the collection, for example, as the newest content item within the collection (e.g., uploaded or added most recently) and/or as the content item having the least number of interactions. In some implementations, the content hosting system 102 selects multiple content items from the collection for inclusion in the recommendation.

As a result of some collections (e.g., playlists) allowing references or pointers to other content items, the interactions made on a content item may be made within a collection other than the selected collection. For example, the second user may interact with the first video 108a within a first playlist. Another user may interact with the first video 108a within a second playlist. The content hosting system 102 may use the interactions with the first video 108a from both the second user and the other user in selecting a collection that includes the first video 108a (e.g., the channel of the first user) and in selecting the second video 108b within that collection for recommendation to the third user.

The content hosting system 102 provides a recommendation 112 for the second video 108b to another user, such as a third user at the third computer device 104c. The recommendation 112 may include a reference to the second video 108b, such as a title of the second video 108b and/or a link to the second video 108b. The second video 108b may also be embedded in the recommendation 112. The third user may then select the link to send a request to the content hosting system 102 to present the second video 108b or the third user may select the embedded video to begin playing the second video 108b.

The content hosting system 102 may also include in the recommendation 112 an indication of a user that interacted with content from the same collection as the recommended content item and/or an indication of the type of interaction that the user made. For example, the content hosting system 102 may identify the second user as having interacted with content from the same collection as the second video 108b (e.g., "Sally commented on content from this channel"). The identification may include text (e.g., a name, nickname, or handle of the user) or symbols (e.g. an image or avatar of the user). The content hosting system 102 may also make the identification generic (e.g., "three users in your circles endorsed content from this channel"). The content hosting system 102 may also indicate the type of interaction the second user made (e.g., "George liked content in this playlist").

The content hosting system 102 may select the second user for inclusion in the recommendation 112 based on a type of relationship between the second user and the third user and/or an affinity between the second user and the third user. For example, the content hosting system 102 may determine that the second user and the third user have a friend and/or familial relationship rather than a distant and/or business relationship. In another example, the content hosting system 102 may determine that the second user and the third user have a direct relationship as opposed to an indirect relationship though one or more other users. In yet another example, the content hosting system 102 may determine that the second user and the third user have had direct interaction with one or the other's content, whether or not they have a relationship. In choosing the user account to include within the recommendation, the content hosting system 102 may choose friend/familial relationships over distant/business relationships, direct relationships over indirect relationships, and/or co-interaction over no interaction.

The relationships may be explicit or implicit. For example, the content hosting system 102 may allow users to explicitly specify relationships and the relationships may be one-way or two-way. That is, the content hosting system 102 may allow a user to specify that the user is following another user (e.g., a one-way relationship) or the user may request a friendship with another user and the other user may then approve the relationship (e.g., a two-way relationship). The content hosting system 102 may also allow the user to explicitly categorize the relationship, such as a friend, family member, coworker, and/or acquaintance. The content hosting system 102 may also categorize the types of relationships implicitly, such as by analyzing the domain names of an email address associated with the account or the type of account (e.g., a consumer level account versus a business/enterprise account).

The content hosting system 102 may identify an affinity between the second user and the third user by analyzing interactions between the second user and the third user as compared to interactions between other users and the third user. For example, the content hosting system 102 may analyze the number of times that the users interact with content of one another within the content hosting system 102 (e.g., by rating each other's content, adding each other's content to a playlist, sharing each other's content, and/or commenting on each other's content). In another example, the content hosting system 102 may analyze the number of times that the users communicate with one another within the content hosting system 102 or another system (e.g., email, instant messaging, and/or audio/video communication). In yet another example, the content hosting system 102 may analyze whether the users specified that they are following one or the other's channels within the content hosting system 102. The content hosting system 102 then selects the second user (or multiple users) over other users based on the affinity being higher for the second user than the other users (e.g., a higher number of interactions, a higher amount of communication, and/or following rather than not following). In some implementations, the content hosting system 102 may use the relationship types and/or affinities of multiple users that interact with content in multiple collections to choose a collection from which to recommend content. In some implementations, the content hosting system 102 identifies the affinity from a social graph that represents the relationships and/or interactions between the users of the content hosting system 102. The content hosting system 102 or another system may store and/or maintain the social graph.

The content hosting system 102 may select the indication of the type of interaction that the second user made based on a hierarchy. For example, each type of interaction may have a different priority. Uploading content may have a highest priority; sharing content may have a second highest priority; rating/liking content may have a third highest priority; adding content to a playlist may have a fourth highest priority; and commenting on content may have a lowest priority. The content hosting system 102 may then choose from among multiple interactions of the second user based on the priorities of the types of the interactions. In some implementations, the content hosting system 102 may use the interaction types of multiple users that interact with the content in the collection to choose which of the users to include in the recommendation 112. In some implementations, the content hosting system 102 may use the interaction types of multiple users that interact with content in multiple collections to choose a collection from which to recommend content.

In some implementations, one or more of the content items do not have a semantic chronology. For example, the content items may be uploaded to a channel or added to a playlist at a particular time, but the content items may not have a chronological relationship with one another within the channel and/or playlist. Alternatively, one or more of the content items may have a chronological relationship. For example, one or more of the content items in a collection may be episodes within a series of content items for a show (e.g., parts one, two, and three of a movie). The content hosting system 102 may determine that content is episodic and/or chronological by analyzing metadata for the content. For example, the content hosting system 102 may analyze title text or a description of multiple content items for sequential language that occurs across the content items and may also identify some language that is the same (e.g., a first content item with a title of "my kitten video—part one" and a second content item with a title of "my kitten video—part two"). The content hosting system 102 may then treat the series of content items as a collection even though they may not belong to the same channel and/or playlist.

The content hosting system 102 may also analyze user watch-clustering information to determine whether a collection of content items is related. For example, if the content hosting system 102 determines that users rarely watch multiple content items from a particular collection within the same viewing session or within a particular amount of time, then the content hosting system 102 may treat the collection as not being related for the purposes of recommending additional content. Alternatively, the content hosting system 102 may assign a low priority to a collection with low watch-clustering and a high priority to a collection with high watch-clustering. The content hosting system 102 may then use the clustering priorities to select a collection from which to recommend additional content (e.g., by selecting a high priority collection over collections with lower priorities).

Figure 2:
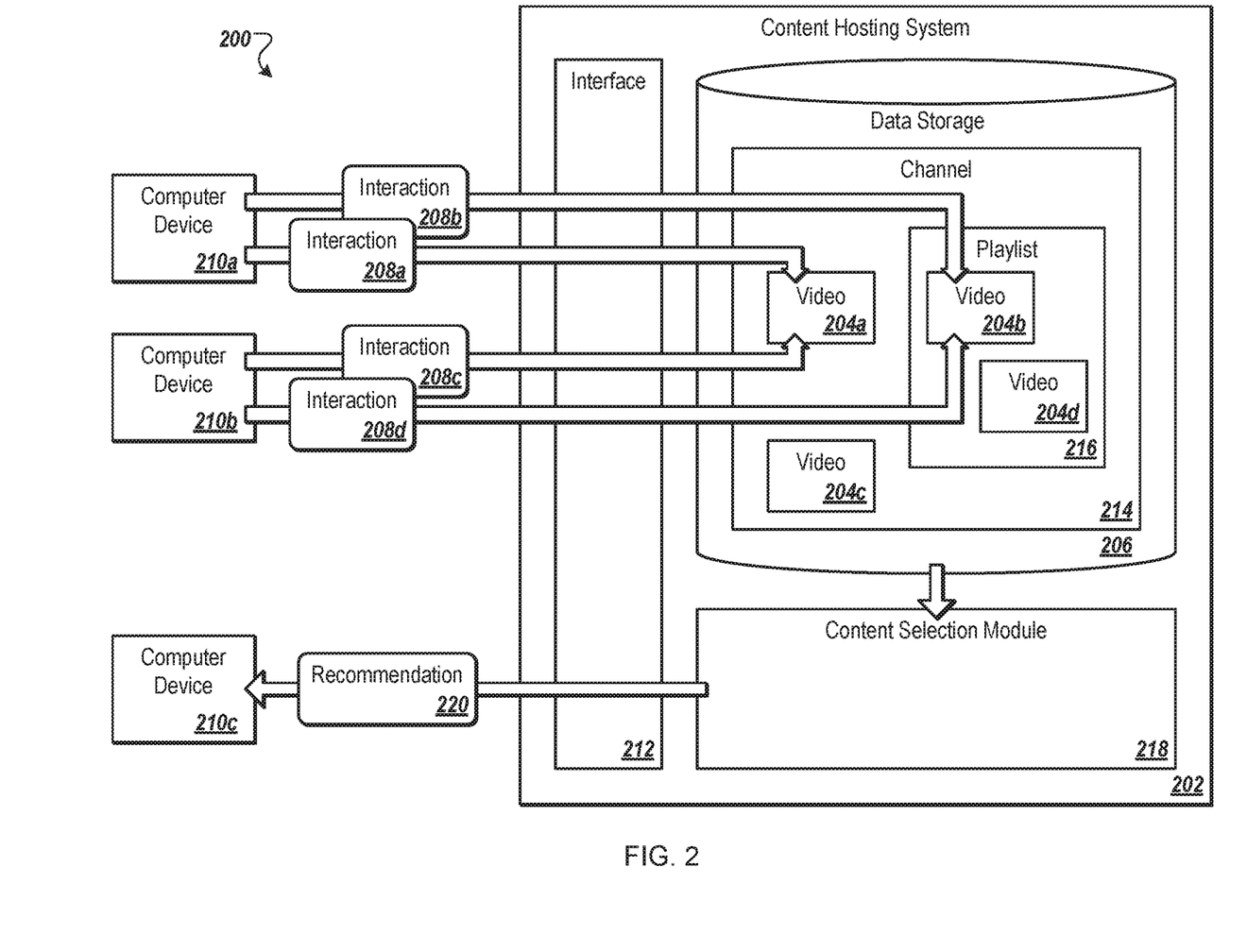
FIG. 2 is a block diagram that shows an example of a system for contextual recommendations based on interaction within collections of content.

FIG. 2 is a block diagram that shows an example of a system 200 for contextual recommendations based on interaction within collections of content. The system 200 includes a content hosting system 202 that stores content items, such as one or more videos 204a-d, in a data storage 206. The content hosting system 202 receives one or more interactions 208a-d with the videos 204a-b from one or more computer devices 210a-c through an interface 212. The interface 212 may provide communication with a network over which the interactions 208a-d are received as well as a user interface with which users at the computer devices 210a-c input the interactions 208a-d, such as a web/browser based user interface or a user interface of an application. The content hosting system 202 also stores information identifying one or more collections for the videos 204a-d, such as a channel 214 and a playlist 216. In addition, the content hosting system 202 may store a record of the interactions 208a-d, such as within the data storage 206.

The content hosting system 202 also includes a content selection module 218. The content selection module 218 selects content for inclusion in a recommendation 220 to a user, such as at the third computer device 210c. The content selection module 218 selects content for the recommendation 220 based on the interactions 208a-d on other content within the same collection. For example, the content selection module 218 may select the third video 204c as a result of the first interaction 208a and the third interaction 208c with the first video 204a, which is in the channel 214 with the third video 204c. In another example, the content selection module 218 may select the fourth video 204d as a result of the second interaction 208b and the fourth interaction 208d with the second video 204b, which is in the playlist 216 with the fourth video 204d.

The second video 204b may also be a member of the channel 214 (e.g., uploaded by a user associated with the channel 214) or the second video 204b may be a pointer to another video from another channel. If the second video 204b is also a member of the channel 214, then the content hosting system 202 may use the second interaction 208b and the fourth interaction 208d with the second video 204b in the selection of the channel 214 and the third video 204c for the recommendation 220.

The content selection module 218 may also include an indication of the user and/or type of interaction that caused the recommendation of the content in the recommendation 220. For example, the content selection module 218 may include an indication that the user from the first computer device 210a and the user from the second computer device 210b interacted with the first video 204a and/or the second video 204b, which are in the channel 214 with the third video 204c that is in the recommendation 220. The content selection module 218 may also include an indication that the user from the first computer device 210a and the user from the second computer device 210b "liked" the first video 204a and/or the second video 204b, which are in the channel 214 with the third video 204c that is in the recommendation 220.

The content selection module 218 may base the selection of the collection and the recommended content within the collection on the relationship between the users. For example, a first user may interact with content from a collection. A second user may be receiving a recommendation. The content selection module 218 may use the type of the relationship between the first user and the second user to determine how relevant the collection is to the second user. The content selection module 218 may also use the affinity of the relationship between the first user and the second user to determine how relevant the collection is to the second user. In addition, the content selection module 218 may use the type of the interaction to determine how relevant the collection is to the second user. For example, the content selection module 218 may treat uploads as more relevant than shares, which may be more relevant than ratings, which may be more relevant than additions to playlists, which may be more relevant than comments.

In situations in which the systems discussed here collect personal information about users, or may make use of personal information, the users may be provided with an opportunity to control whether the content hosting systems 102 and 202 collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content hosting systems 102 and 202.

Figure 3:
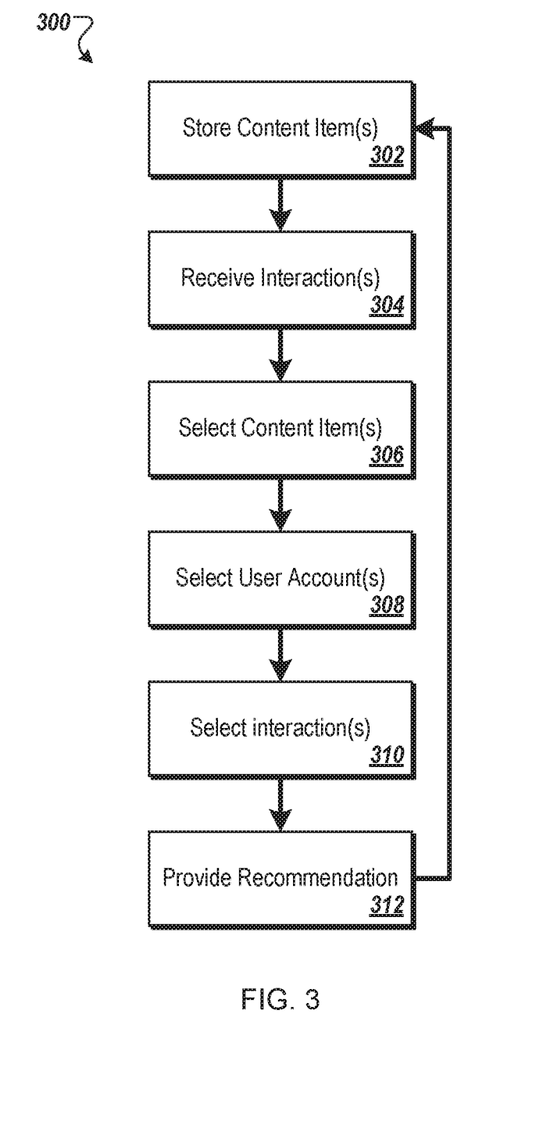
FIG. 3 is flow chart that shows an example of a process for contextual recommendations based on interaction within collections of content.

FIG. 3 is a flow chart that shows an example of a process 300 for social annotation based on action aggregation within collections. The process 300 may be performed, for example, by a system such as the system 100 and the system 200. For clarity of presentation, the description that follows uses the system 100 and the system 200 as examples for describing the process 300. However, another system, or combination of systems, may be used to perform the process 300.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be appreciated that the processes disclosed in this specification are capable of being stored on an article of manufacture to facilitate transporting and transferring such processes to computing devices. The term "article of manufacture," as used herein, is intended to encompass a computer program accessible from a computer-readable device or storage media.

The process 300 begins, at block 302, with storing one or more first content items and a second content item that belong to a collection at a content hosting system. For example, the content hosting system 202 may stores the videos 204a-d in the data storage 206.

At block 304, the process 300 includes receiving one or more interactions with the first content items from one or more first user accounts. For example, the content hosting system 202 may receive the interactions 208a-d with the first video 204a and the second video 204b from the first computer device 210a and the second computer device 210b.

At block 306, the process 300 includes selecting the second content item based on the interactions with the first content items and on the second content item belonging to the same collection as the first content items. For example, the content selection module 218 may select the third video 204c based on the first interaction 208a and the third interaction 208c in the channel 214. In another example, the content selection module 218 may select the fourth video 204d based on the second interaction 208b and the fourth interaction 208d in the playlist 216.

At block 308, the process 300 may include selecting a particular user account from the first user accounts. The first user accounts may include one or more different user accounts. The first content items in the collection may include content items from ones of the first user accounts other than the particular user account. The first user accounts may have a plurality of types. Each type in the plurality of types may have a priority. The process 300 may include selecting the particular user account based on the priority of the type of the particular user account. Each of the first user accounts may have an affinity with the second user account based on interactions between the first user accounts and the second user account, such as by users of the first accounts interacting with content (e.g., viewing, rating, sharing, etc.) provided by the user of the second account. The process 300 may include selecting the particular user account based on the affinity between the particular user account and the second user account. For example, the content selection module 218 may select a user account from the first computer device 210a and/or a user account from the second computer device 210b based on the affinity between the two accounts being higher than the affinities between other user accounts.

At block 310, the process 300 may include selecting a particular interaction from the interactions. The interactions may have a plurality of types. Each type in the plurality of types may have a priority. The process 300 may include selecting the particular interaction based on the priority of the type of the particular interaction. For example, the content selection module 218 may prioritize types such as uploads higher than shares, which are higher than ratings, which are higher than playlist additions, which are higher than comments (or another ordering of priorities for the interaction types). The content selection module 218 may then select an upload, share, rating, playlist addition, and/or comment type of interaction for inclusion in the recommendation 220.

At block 312, the process 300 includes providing a recommendation to a second user account to view the second content item. The recommendation may include an indication of the selected user account. The recommendation may include an indication of the selected interaction. For example, the content selection module 218 may provide the recommendation 220 to the third computer device 210c using a web/browser interface or a user interface of an application.

Figure 4:
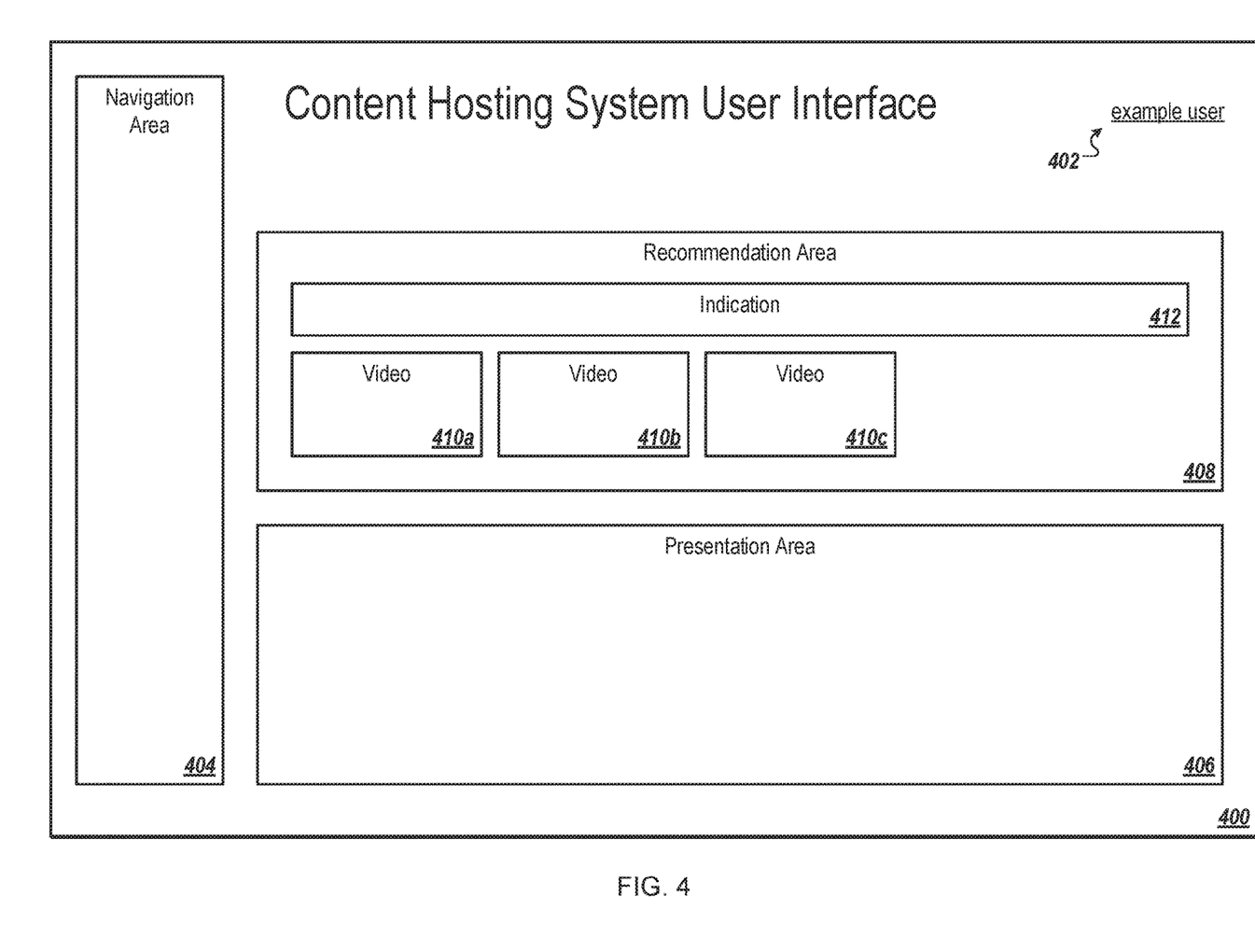
FIG. 4 shows an example of a user interface for presenting contextual recommendations based on interaction within collections of content.

FIG. 4 shows an example of a user interface 400 for presenting contextual recommendations based on interaction within collections of content, in accordance with some aspects of the same disclosure. The user interface 400 may be provided by the content hosting system 102 and/or the interface 212. The user interface 400 and/or data for the user interface 400 may be provided by a content hosting system to a computer device, for example, in response to a request from the computer device to present the user interface 400. The user interface 400 may be a web page within a web browser application. Alternatively, the user interface 400 may be within a desktop application or mobile device application other than a web browser application at a computer device and may present information provided by a content hosting system.

The user interface 400 includes an indication 402 of a user account (e.g., "example user") that is currently logged in to the content hosting system. The user interface 400 also includes a navigation area 404 and a presentation area 406. The navigation area 404 includes user input controls that allow a user to select content for presentation in the presentation area 406. For example, the navigation area 404 may include a control for requesting presentation of content in the presentation area 406 from all of the channels to which the user has subscribed as well as controls for requesting presentation of content in the presentation area 406 for specific channels.

The user interface 400 also includes a recommendation area 408. The recommendation area 408 presents recommendations of one or more content items, such as one or more videos 410*a-c*. The recommendations may be links that, when selected, direct the user interface 400 to the recommended content. The recommendations may be embedded content within the recommendation area 408 that, when selected, cause the content to play within the recommendation area 408. The recommendation area 408 may also include an indication 412 of one or more users that interacted with other content from the same collection as the recommended content (e.g., "your friends Abhay and Zahra endorsed content in this channel") and/or the type of interaction made with the other content (e.g., "Lucas liked content in this playlist and Anisha shared content from this playlist").

The user interface 400 may present generic information for the users that interacted with the other content in the collection (e.g., "two people in your circles endorsed content in this collection"). In some implementations, the user interface 400 may provide an input control, such as a link in part of the generic information, to request additional information about the generic information, such as the identities of the user, the types of interactions that were made, and/or the content with which the other users interacted.

The user interface 400 may also group multiple recommendations by collection. For example, the content hosting system may select multiple content items from multiple collections for recommendation to the user. The user interface 400 may then include subdivisions in the recommendation area 408 for each collection. The user interface 400 may also include separate indications of the users and/or types of interaction for each of the subdivisions in the recommendation area 408.

Figure 5:
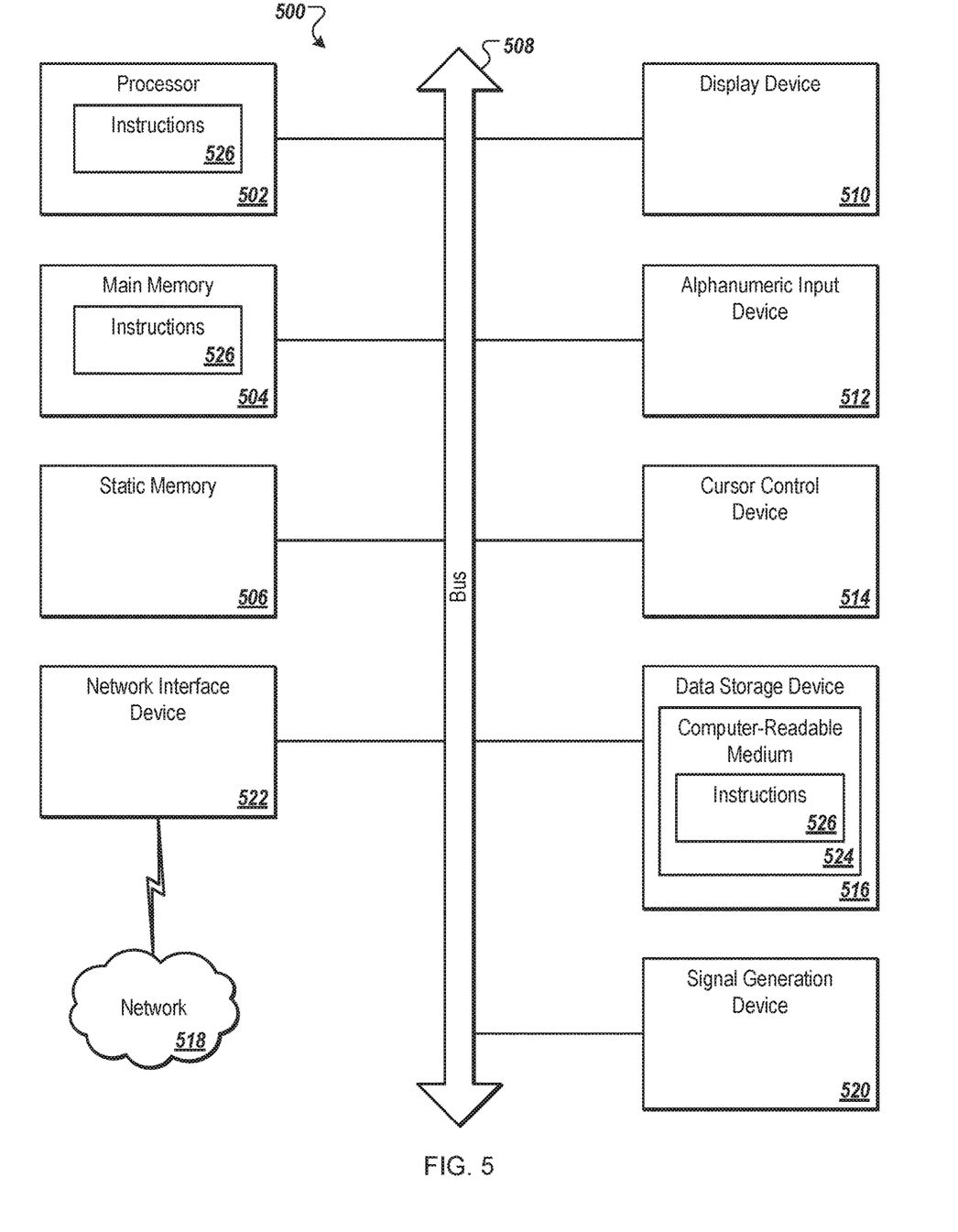
FIG. 5 is a schematic diagram that shows an example of a computer system.

FIG. 5 is a schematic diagram that shows an example of a machine in the form of a computer system 500. The computer system 500 executes one or more sets of instructions 526 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 526 to perform any one or more of the methodologies discussed herein.

The computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions of the content hosting systems 102 and 202 for performing the operations and steps discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored the sets of instructions 526 of the content hosting systems 102 and 202 embodying any one or more of the methodologies or functions described herein. The sets of instructions 526 of the content hosting systems 102 and 202 may also reside, completely or at least partially, within the main memory 504 and/or within the processor 502 during execution thereof by the computer system 500, the main memory 504 and the processor 502 also constituting computer-readable storage media. The sets of instructions 526 may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions 526. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
storing a plurality of references to one or more first videos and at least one second video at a content hosting system for a first playlist;
receiving one or more first interactions with the first videos from one or more first user accounts;
selecting, by at least one processing device, the second videos for a recommendation to a second user account based on the second videos belonging to the same first playlist as the first videos and on the first interactions with the first videos from the first user accounts, wherein the second user account being a user account that is other than the first user accounts associated with the first interactions; and
providing, for presentation in a user interface, the recommendation to view the second videos to the second user account.

2. The method of claim 1, wherein selecting the second videos is further based on a number of the first videos for the first interactions of the first playlist being greater than a number of the second videos for second interactions of one or more second playlists.

3. The method of claim 1, wherein selecting the second videos is further based on a number of the first interactions with the first videos in the first playlist being greater than a number of second interactions with the second videos in one or more second playlists.

4. The method of claim 1, wherein there has been no interaction with the second videos.

5. The method of claim 1, wherein selecting the second videos is further based on the second videos having a least number of interactions among videos within the first playlist.

6. The method of claim 1, wherein selecting the second videos is further based on the second videos being at least one or more newest videos among videos within the first playlist.

7. The method of claim 1, wherein one or more of the first videos belong to at least one second playlist, and wherein one or more of the first interactions with the first videos occur in conjunction with presentation of the one or more of the first videos with the second playlist.

8. A non-transitory computer-readable medium having instructions stored therein that, when executed by at least one processing device, cause the processing device to:
store a plurality of references to one or more first videos and at least one second video at a content hosting system for a first playlist;
receive one or more first interactions with the first videos from one or more first user accounts;
select, by the processing device, the second videos for a recommendation to a second user account based on the second videos belonging to the same first playlist as the first videos and on the first interactions with the first videos from the first user accounts, wherein the second user account being a user account that is other than the first user accounts associated with the first interactions; and
provide, for presentation in a user interface, the recommendation to view the second videos to the second user account.

9. The computer-readable medium of claim 8, wherein the selection of the second videos is further based on a number of the first videos for the first interactions of the first playlist being greater than a number of the second videos for second interactions of one or more second playlists.

10. The computer-readable medium of claim 8, wherein the selection of the second videos is further based on a number of the first interactions with the first videos in the first playlist being greater than a number of second interactions with the second videos in one or more second playlists.

11. The computer-readable medium of claim 8, wherein there has been no interaction with the second videos.

12. The computer-readable medium of claim 8, wherein the selection of the second videos is further based on the second videos having a least number of interactions among videos within the first playlist, and wherein the selection of the second videos is further based on the second videos being a newest video among videos within the first playlist.

13. The computer-readable medium of claim 8, wherein one or more of the first videos belong to at least one second playlist, and wherein one or more of the first interactions with the first videos occur in conjunction with presentation of the one or more of the first videos with the second playlist.

14. A system comprising:
  at least one memory that stores instructions; and
  at least one processing device configured to execute the instructions to:
    store a plurality of references to one or more first videos and at least one second video at a content hosting system for a first playlist;
    receive one or more first interactions with the first videos from one or more first user accounts;
    select the second video based on the second videos for a recommendation to a second user account based on the second videos belonging to the same first playlist as the first videos and on the first interactions with the first videos from the first user accounts, wherein the second user account being a user account that is other than the first user accounts associated with the first interactions; and
    provide, for presentation in a user interface the recommendation to view the second videos to the second user account.

15. The system of claim 14, wherein the selection of the second videos is further base on a number of the first videos for the first interactions of the first playlist being greater than a number of the second videos for second interactions of one or more second playlists.

16. The system of claim 14, wherein the selection of the second videos is further based on a number of the first interactions with the first videos in the first playlist being greater than a number of second interactions with the second videos in one or more second playlists.

17. The system of claim 14, wherein there has been no interaction with the second videos.

18. The system of claim 14, wherein the selection of the second videos is further based on the second videos having a least number of interactions among videos within the first playlist.

19. The system of claim 14, wherein the selection of the second videos is further based on the second videos being a newest video among videos within the first playlist.

20. The system of claim 14, wherein one or more of the first videos belong to at least one second playlist, and wherein one or more of the first interactions with the first videos occur in conjunction with presentation of the one or more of the first videos with the second playlist.

* * * * *